A. KLELL.
HOSE COUPLING.
APPLICATION FILED MAR. 15, 1915.
1,300,414.
Patented Apr. 15, 1919.
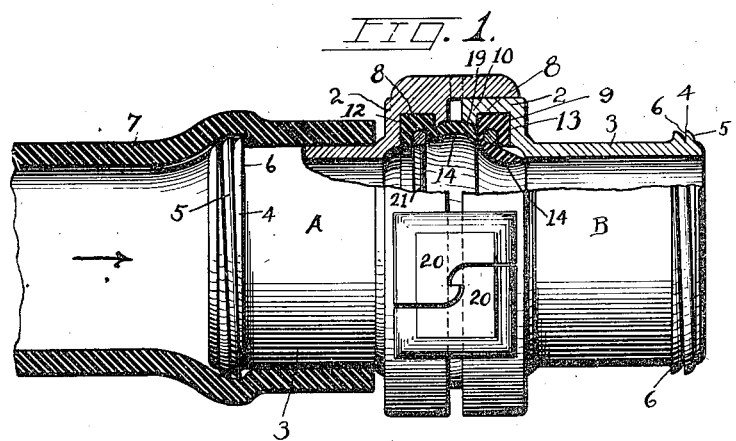
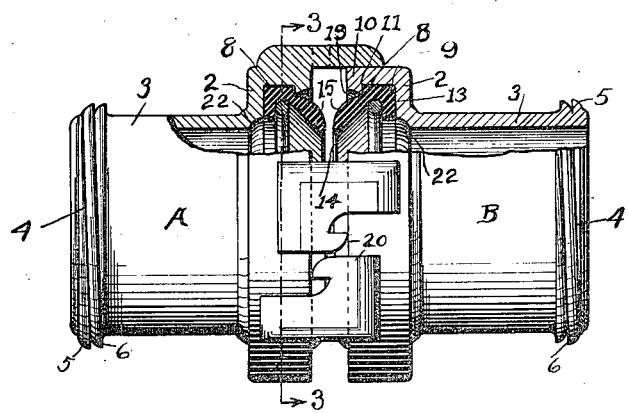
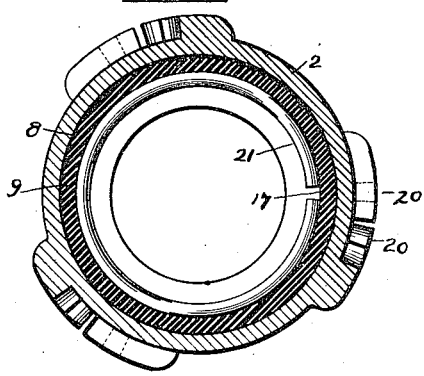
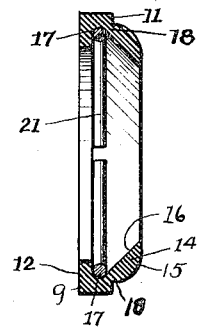
WITNESSES:
INVENTOR.
ALBERT KLELL.
BY
ATTORNEYS.

UNITED STATES PATENT OFFICE.

ALBERT KLELL, OF WEST PARK, OHIO.

HOSE-COUPLING.

1,300,414.         Specification of Letters Patent.     Patented Apr. 15, 1919.

Application filed March 15, 1915.   Serial No. 14,360.

*To all whom it may concern:*

Be it known that I, ALBERT KLELL, a citizen of the United States, residing at West Park, in the county of Cuyahoga and State of Ohio, have invented certain new and useful Improvements in Hose-Couplings, of which the following is a specification.

This invention relates to improvements in hose couplings and the improvement comprises a pair of coupling members and sealing rings or washers of identical construction adapted to detachably secure the parts together in water-tight union, all substantially as hereinafter shown and described and more particularly pointed out in the claim.

In the accompanying drawings, Figure 1 is a side view, partly in section of a pair of coupling members united and showing the sealing rings expanded as under internal pressures.

Fig. 2 is a view corresponding to Fig. 1 but with the parts as they appear when partially separated. Fig. 3 is a transverse section of one coupling on line 3—3, Fig. 2, and Fig. 4 is a sectional view of a rubber ring or washer and a split fastening wire therefor.

Two coupling members A and B are used. These are counterparts, or in other words, of identical construction. Thus each member consists of a round head 2 having a reduced cylindrical neck 3 with a short external screw thread 4 at its outer end. Thread 4 has an outer rounded face 5 to facilitate the screwing thereon of a hose 7 and a flat vertical inner face 6 to produce a sharp edge adapted to embed itself in the inner wall of the hose and to securely hold the hose after the coupling member is screwed in place.

Head 2 has a flat-sided annular channel 8 therein of substantial depth to seat and hold a rubber ring or washer 9 and the narrow inwardly projecting rib or bead 10 of the head bears against the narrow flat side 11 of the gasket whereas the wider flat side 12 of the gasket bears against the wide flat inner wall 13 of head 2. Gasket 9 has a front converging portion 14 with an outer rounded surface 15 and an inner straight flare 16 beginning at the base of an annular groove 17 within the square-sided portion of the gasket and terminating in a sharp edge where the rounded portion is of the smallest diameter. A relatively thin neck 18 opposite groove 17 affords an extremely flexible base or connection for the converging portion 14. In other words, portion 14 is an expansible and flexible annular lip which is adapted to cushion the two coupling members A and B and also press them apart with a spring action when brought together. Under internal pressure lip 14 is also adapted to flex and seat its rounded surface 15 within the rounded edge seat 19 of the inwardly projecting rib or bead 10 of each coupling A and B with the thin end edge of portion 14 in hugging engagement with the adjacent gasket 9, see Fig. 1. This occurs when the direction of flow of the water is toward the right, and in this case the gasket 9 at the right is flexed inward as shown. But if the flow of water is in the reverse direction, that is, to the left, then the respective gaskets are flexed in that direction. The greater the internal pressure the more effective the seal, but moderate pressure will also expand the flexible portions 14 of each washer more or less so that a water-tight union is always maintained when two annular coupling members are connected.

Quick attachment and detachment and secure interlocking of the coupling members is effected by a series of hook-shaped projections 20 cast integral at equally-distant radial points on head 2 of each member. In making connections the hook projections of each member overlap the opposite head when the two members are pressed together, which brings the rounded projecting portion 14 of the rubber gaskets into cushioning engagement. Rotation of the members follows after the hook ends have been pressed beyond each other and then the spring in the rubber gaskets separates the members again, but only as far as the interlocking hook ends will permit. Separation of the two members is easily effected by pressing the members together until the hook ends are disengaged with each other and by rotating the member sufficiently to afford clearance between said hook ends and withdrawal of one of the members. In the larger sizes of couplings, I find it desirable to seat a split spring wire ring 21 within groove 17 of each gasket to more securely hold the gasket in place, but this ring may be dispensed with in the smaller couplings.

An inner groove 22 at the entrance to head 2 provides a clearance space or enlarged outlet for the water which prevents the flowing water from unseating the ring gasket and this groove also accommodates the inner edge portion of the flexible lip of the gasket when flexed backward.

What I claim is:

As a new article of manufacture, a hose coupling consisting of two units operatively related one within the other, one of said units having an annular extension to engage hose thereon and a head with a front extension to engage over the other unit and an annular channel within said head having an inwardly projecting rib about its side provided with a transversely rounded and flaring edge, and the other unit having a head sleeved within the first named unit and provided with an annular channel with a rim about its side having the edge thereof transversely rounded and flaring and forming part of an arc with the corresponding rib on the other unit, and a rubber gasket in each of said annular channels having an annular extension with a relatively thin neck portion to allow the same to flex and rounded transversely on its back outside said neck and adapted to bear against the corresponding rounded and flaring edges of the ribs on the heads of the said units, and means on said heads adapted to lock said units separably together.

In testimony whereof I affix my signature in presence of two witnesses.

ALBERT KLELL.

Witnesses:
R. B. MOSER,
ADOLPH O. FUERST.